United States Patent [19]

Kawamura et al.

[11] Patent Number: 4,904,365

[45] Date of Patent: Feb. 27, 1990

[54] ELECTRODEPOSITION COATING FACILITY

[75] Inventors: Toshio Kawamura, Toyota; Norihisa Nihei, Yokohama; Tadamichi Hirono, Nagoya; Tadayoshi Hyodo, Minoo, all of Japan

[73] Assignee: Trinity Industrial Corporation, Tokyo, Japan

[21] Appl. No.: 316,704

[22] Filed: Feb. 28, 1989

[30] Foreign Application Priority Data

Feb. 29, 1988 [JP] Japan .............................. 63-24977[U]
Feb. 29, 1988 [JP] Japan .............................. 63-24981[U]

[51] Int. Cl.⁴ ..................... C25D 17/06; C25D 17/08
[52] U.S. Cl. ........................... 204/299 EC; 204/180.2; 204/300 EC; 118/404; 118/419; 118/423; 118/428; 118/500
[58] Field of Search ....... 204/180.2, 299 EC, 300 EC; 118/404, 405, 419, 423, 424, 428, 500

[56] References Cited

FOREIGN PATENT DOCUMENTS 52-165165 12/1977 Japan .
56-33477  8/1981 Japan .
58-3996   1/1983 Japan .
62-9329   3/1987 Japan .
62-153373 9/1987 Japan .

Primary Examiner—John F. Niebling
Assistant Examiner—David G. Ryser
Attorney, Agent, or Firm—Cushman, Darby & Cushman

[57] ABSTRACT

An electrodeposition coating facility comprising a conveyor for conveying articles to be coated, hangers each suspended from the conveyor and formed into an L-shaped configuration composed of a vertical portion and a horizontal portion, hanger support roller each disposed at or near the lower end of the L-shaped hanger and a guide rail laid along an electrodeposition coating line for guiding and holding the hanger support roller and support means each comprising a stud made of insulating plastic secured to an electrodeposition vessel and a metal support applied with insulating coating and secured to the top end of the stud for fixing the guide rail to the electrodeposition vessel. The guide rail may be passed through a subsequent cleaning vessel for removing paint dusts, etc. by applying compulsory rotation or supersonic vibration. The coating quality can be maintained satisfactorily during electrodeposition coating.

5 Claims, 6 Drawing Sheets

ELECTRODEPOSITION COATING FACILITY

BACKGROUND OF THE INVENTION

1. Field of the Invention

The present invention concerns an electrodeposition coating facility for conveying articles to be coated while carrying them on hangers of a conveyor through steps of pre-treatment, electrodeposition and water washing.

2. Description of the Prior Art

In electrodeposition coating lines for automobiles or cars, car bodies as articles to be coated are continuously conveyed, while being carried on hangers of a conveyor, through a pre-treatment step, an electrodeposition step and a water washing step successively. When a car body after pre-treatment is transferred to the electrodeposition step, it is immersed, for example, in a cationic solution of electrodeposition paint contained in an electrodeposition vessel in which membrane electrodes are disposed as positive electrodes along the side wall of the electrodeposition vessel and electrolytically deposited films are formed on the surface of the car body which is carried on the hanger of the conveyor and connected with the negative electrode by way of the hanger.

The shape of the hanger for carrying the car body thereon conventionally used at present in the electrodeposition coating is generally classified into (a) a gate-shaped configuration (as disclosed in Japanese Patent Publication Sho 56-33477, Japanese Patent Laid-Open Application Sho 58-3996, Japanese Utility Model Publication Sho 62-9329 and Japanese Utility Model Laid-Open Application Sho 52-165165) and a C-shaped configuration (Japanese Utility Model Publication Sho 62-9329 and Japanese Utility Model Laid-Open Application Sho 62-153373).

However, in the hangers of the gate-shaped or C-shaped configuration, since an upper portion of the hanger and the conveyor rail for suspending that portion of the hanger are always present just above the car body carried on the hanger, there have been troubles that droplets of solutions of pre-treatment liquid or electrodeposition paint adhered to the hanger, or lubricant oils or dusts adhered to the surface of the conveyor rail are dropped to the car body, causing defects in coated paint layers during electrodeposition coating.

SUMMARY OF THE INVENTION

Accordingly, it is an object of the present invention to provide an electrodeposition coating facility by which neither a portion of a hanger nor a conveyor rail is situated just above an article to be coated carried on the hanger and, thus, the risk of causing defects in coated paint films can be avoided.

The foregoing object of the present invention can be attained by an electrodeposition coating facility comprising:
conveyor means for conveying articles to be coated,
hanger means each suspended from the conveyor means for carrying an article to be coated and formed into an L-shaped configuration composed of a vertical portion and a horizontal portion,
hanger support roller means each disposed at or near the lower end of the L-shaped hanger means, and
guide rail means laid along an electrodeposition coating line for guiding and holding the hanger support roller means, and
support means each comprising a stud made of insulating reinforced plastic secured to an electrodeposition vessel and a metal support applied with insulative coating and secured in connection with the top end of the stud for fixing the guide rail to the electrodeposition vessel.

In the fundamental feature of the present invention, the hanger suspended from the conveyor for conveying the article to be coated is formed into the L-shaped configuration composed of the vertical portion suspended from the conveyor and the horizontal portion extended from the lower end of the vertical portion for carrying the article thereon.

In the L-shaped hanger as described above, when the car body is carried thereon, since the rotational force is exerted in the direction opposite to the extending direction of the horizontal portion, around the upper end of the vertical portion as a fulcrum, the entire hanger tends to tilt greatly.

In view of the above, as the second feature of the present invention, the hanger support roller is disposed at or near the lower end of the L-shaped hanger, while the guide rail, against which the roller is hold, is disposed along the electrodeposition coating line for guiding and holding the L-shaped hanger.

In this case, it is necessary that the guide rail disposed in the electrodeposition vessel and the support member for fixing the guide rail to the electrodeposition vessel have to be electrically insulated from each other so that the L-shaped hanger is insulated from the electrodeposition vessel.

In the case of a guide rail used for supporting the L-shaped hanger carrying a heavy article, the rail has to be made of metal material applied with insulative surface coating in view of the strength thereof. In this case, the rail support member can not be made of metal, because of short-circuit fear between the L-shaped hanger and the electrodeposition vessel by way of the metal support member. Specifically, since insulation between them is broken by a metal bolt used for connecting them, even when insulative coating is applied to both of the metal guide rail and the metal support member, short circuit may possibly be caused by the peeling of the insulative coating on the rail surface upon violent collision of the hanger support roller of the L-shaped hanger against the metal guide rail.

The above short-circuit risk may be overcome by making the support member with insulating plastic material. However, since the length, etc. of individual support members have to be varied depending on the inner size or the structure of the electrodeposition vessel, if the support members are made, for example, by integral plastic molding depending on the cases, the molding cost is remarkably increased to increase the installation cost.

In addition, since the guide rail disposed in the electrodeposition vessel is frequently detached or attached for inspection, repair, etc., if the support member is integrally molded from plastic material, frequent clamping and removing of a fixing bolt may cause cracking in the plastic material, or the inner threads for engaging the bolt may be abrased easily to make the clamping action bolt effective.

In view of the above, in the present invention, the support member for fixing the guide rail to the electrodeposition vessel comprises a stud made of insulating reinforced plastic material secured to the electrodeposition vessel and a metal support applied with insulative coating and secured in connection with the top end of the stud.

Next, in the, electrodeposition coating, coating paint is adhered to the hanger support roller disposed to the lower end of the L-shaped hanger as the hanger passes through the electrodeposition vessel, which is then solidified with elapse of time, to hinder the hanger support roller from rotating smoothly or even make the rotation quite impossible.

Particularly, those coating paints intruding into the narrow gap between the rotational shaft and the bearing of the hanger support roller can not completely be washed out by spraying in the water washing step disposed subsequent to the electrodeposition step. Accordingly, the coating paints are dried and solidified as they are to hinder the rotation of the hanger support roller, thereby causing rattling in the L-shaped hanger to invite accidents such as falling of an article to be coated from the hanger or destruction of the guide rail.

Further, if the hanger support roller does not rotate smoothly, the insulative coating applied to the surface of the guide rail may possibly be peeled off by the intense frictional force.

In addition, if the coating paints are adhered to and dried on the hanger support roller of the L-shaped hanger, paint dusts defoliated from the hanger support roller, during passage of the L-shaped hanger through the pre-treatment step or electrodeposition step in the course of cyclic movement in the electrodeposition coating line, would intrude into the solutions of pre-treatment liquid or electrodeposition coating paint, to form seedings at the surface of the article to be coated, leading to defective coated layers.

In view of the above, the guide rail is laid so as to pass through the cleaning vessel disposed subsequent to the electrodeposition vessel in the second present invention.

In this case, rotational driving means is disposed along an intermediate path of the guide rail. In a preferred embodiment an intermediate portion of the guide rail immersed in a cleaning liquid in a cleaning vessel is recessed or cut-away for a predetermined length and a rotational driving member is intervened to the recessed portion for compulsorily rotating the hanger support roller at a high speed as it runs therealong.

In the third invention, the guide rail is laid so as to pass through the cleaning vessel disposed subsequent to the electrodeposition vessel and supersonic wave generators are disposed in the cleaning vessel for giving supersonic vibrations to the hanger support roller immersed in the cleaning liquid.

As the main function of the present invention, since the hanger suspended from the conveyor for conveying an article to be coated carried thereon is formed into the L-shaped configuration, it is possible to surely prevent droplets of solutions of pre-treatment liquid or electrodeposition coating paint adhered to the hanger or lubricants, dusts, etc. adhered to the conveyor rail from falling onto the article to be coated, thereby enabling to avoid defective coating.

Further, since the hanger support roller disposed at or near the lower end of the L-shaped hanger is held on the guide rail laid along the electrodeposition coating line, the hanger can smoothly move along the electrodeposition coating line while firmly supporting the weight of the article to be coated.

In a preferred embodiment in which a guide rail is laid at such a height as capable of holding the vertical portion of the L-shaped hanger when the latter is tilted upon destruction of the hanger support roller etc. Accordingly, if the hanger support roller should happen to be broken, direct collision of the L-shaped hanger against electrodes, etc. disposed in the electrodeposition vessel, dropping of the article from the hanger, or like other accident can surely be prevented.

Furthermore, the support member for supporting the guide rail in the electrodeposition vessel comprises a stud made of insulating reinforced plastic material secured to the electrodeposition vessel and a metal support secured in connection with the top end of the stud. Therefore, even if the insulative coating applied to the surface of the guide rail disposed to the electrodeposition vessel is peeled off by the strong friction or impact shock resulted upon collision of the hanger support roller of the L-shaped hanger, the L-shaped hanger can be completely insulated electrically from the electrodeposition vessel by means of the stud made of reinforced plastic material that constitutes a portion of the support member.

In addition, since the top end of the support member for securing the guide rail is made of metal support, if the guide rail is frequently mounted or removed for inspection, repair, etc. there is no worry that the bolt used for clamping the guide rail to the support member is slackened.

Furthermore, in the support members, the length, shape, etc. of the studs made of reinforce plastic material requiring great molding cost can be standardized and they can be mass-produced relatively inexpensively, while the length, shape, etc. only of the metal supports, for which fabrication is easy and inexpensive, may be varied appropriately depending on the size and the structure of the electrodeposition vessel. Therefore, they may be adapted easily to various kinds of electrodeposition vessels to remarkably reduce the installation cost.

Then, the hanger support roller of the L-shaped hanger after passed through the electrodeposition vessel is sent into the cleaning vessel disposed subsequent to the electrodeposition vessel while being guided along the guide rail.

The hanger support roller passing through the cleaning vessel being immersed in the cleaning liquid is abutted against and forcively rotated by the rotational driving member, and the electrodeposition coating paint intruded into the narrow gap between the rotational shaft and the bearing of the roller can also be washed out completely.

In a case where supersonic wave generators are disposed in the cleaning vessel, supersonic vibrations are given to the hanger support roller immersed in the cleaning liquid, by which the entire roller is vibrated and the electrodeposition paints adhered to the surface are completely removed to enable complete cleaning throughout the hanger support roller.

It is thus possible to surely prevent the incomplete rotation of the hanger support roller caused by the drying and solidification of the electrodeposition paints adhered to the roller, or defective coating caused by the intrusion of the paint dusts defoliated from the roller into the solution of the pre-treatment liquid or electrodeposition coating paint.

BRIEF DESCRIPTION OF THE ACCOMPANYING DRAWINGS

These and other objects, as well as advantageous features of the present invention will become more apparent by reading the following descriptions for the preferred embodiments of the present invention in conjunction with the accompanying drawings, wherein FIG. 1 is a front elevational view illustrating one embodiment of an electrodeposition coating facility according to the present invention;

DETAILED DESCRIPTION OF THE PREFERRED EMBODIMENTS

Figure 1:
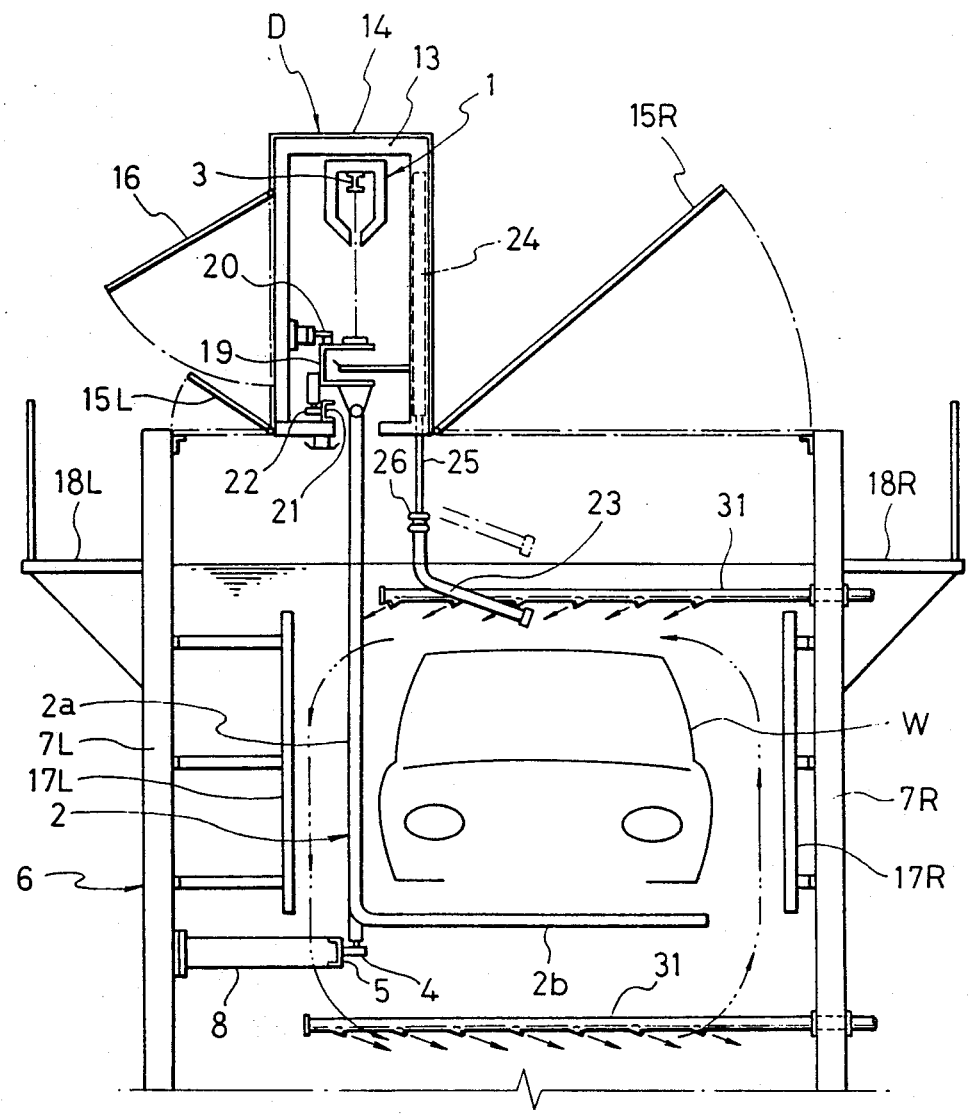

In an embodiment shown in FIGS. 1 through 5, a conveyor 1 for conveying a car body W as an article to be coated comprises an L-shaped hanger 2 composed of a vertical portion 2a and a horizontal portion 2b, so that neither the upper portion of the hanger 2 nor a conveyor rail for suspending the hanger 2 are situated just above the car body W carried on the horizontal portion 2b, for preventing droplets of solutions of pre-treatment liquid and electrodeposition paint adhered to the hanger 2, or lubricants or dusts adhered to the conveyor rail 3 from falling to the car body W.

The L-shaped hanger 2 has a hanger support roller 4 disposed at the lower end of the vertical portion 2a, by which the hanger 2 is abutted against and supported by a metal guide rail 5 laid along the electrodeposition coating line in an electrodeposition vessel 6 which contains the solution of electrodeposition paint therein.

The guide rail 5 is applied with insulative coating at the surface and secured by means of bolts 9 to the top ends of support members 8, 8,—which are disposed along and protruded from the left wall 7L in the electrodeposition vessel 6 (in FIG. 1).

Figure 3:
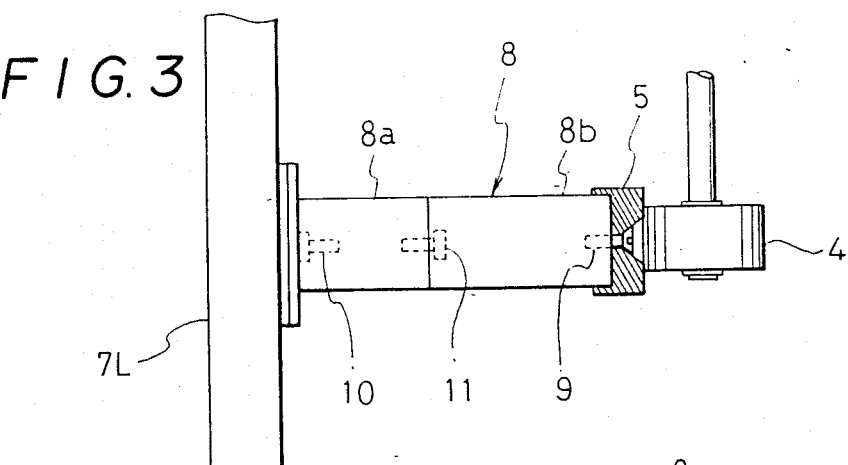
FIG. 3 is an enlarged front elevational view for the guide rail and the support used in this embodiment.

As shown more specifically in FIG. 3, each of the support members 8 comprises a support stud 8a made of insulating reinforced plastics and secured directly by means of a bolt 10 to the left wall 7L of the electrodeposition vessel 6 and a support 8b made of metal applied with insulative coating and secured to the top end of the stud 8a by means of a bolt 11.

With such a constitution, the L-shaped hanger 2 carrying the car body W is passed through the electrodeposition vessel 6 while being firmly held and guided on the guide rail 5 by means of the hanger support roller 4. Further, the L-shaped hanger 2 can always be electrically insulated from the electrodeposition vessel 6 by means of the stud 8a made of reinforced plastics that constitutes a part of the support member 8, even when the insulative coating layers at the surface of the guide rail 5 should happen to be peeled off by impact shock or friction caused by the collision of the hanger support roller 4.

In addition, since the top end of the support member 8, to which the guide rail 5 is secured by means of the bolt 9, is formed with the metal support 8b, if the guide rail 5 is frequently replaced for periodical inspection, etc. there is no worry at all that the bolt 9 loses its clamping function.

Furthermore, the support members 8 can be adapted easily to individual electrodeposition coating vessels of different inner width and structure by mass-producing each of the studs 8a made of reinforced plastics to an identical size by means of molding, etc. while fabricating individual metal supports 8b to various appropriate length and shape depending on the size, structure, etc. of the electrodeposition vessels. This can reduce the installation cost.

Figure 4:
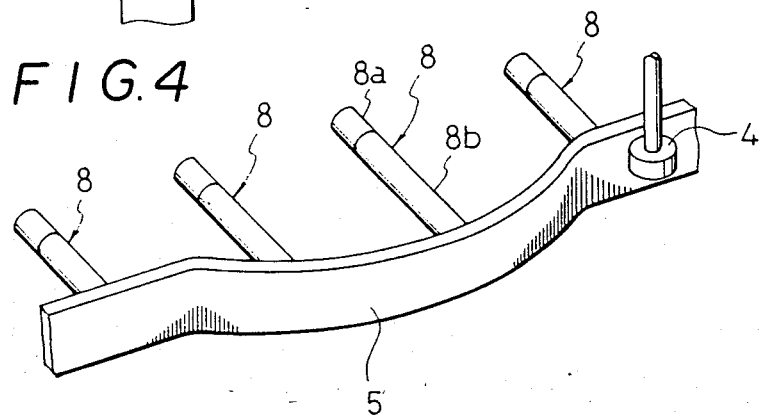
FIG. 4 is a perspective view thereof.

For instance, as shown in FIG. 4, in a case where the guide rail 5 is disposed so as to form a curved path, support members 8 each of different length are necessary. In such a case, each of the support studs 8a made of reinforced plastics may be of an identical length, and only the length of individual metal supports 8b is varied. Such a bent guide rail 5 is desirably for tilting the L-shaped hanger 2 during running thereby tilting the car body W carried on the horizontal portion 2b by a predetermined angle with an aim of previously driving out air from the inside of the body W to prevent defective electrodeposition caused by the clinging of bubbles.

Figure 5:
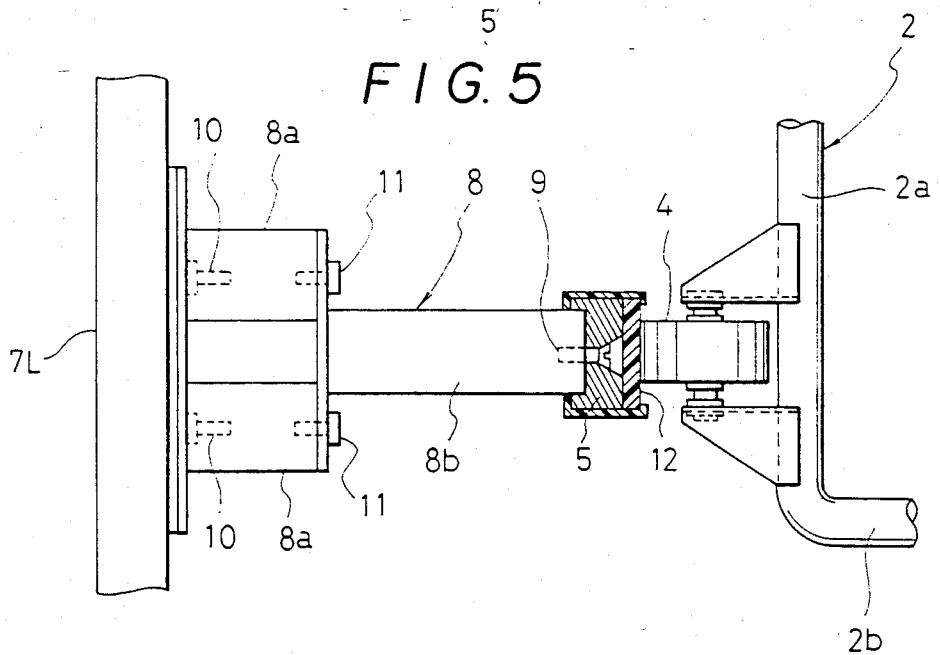
FIG. 5 is an enlarged front elevational view showing a modified embodiment of the support member.

In a case where the weight of the car body W is heavy, it is desirable to increase the entire strength of the support member 8, by supporting the metal support 8b to a pair of upper and lower studs 8a, 8b made of reinforced plastics as shown in FIG. 5.

Further, also as shown in FIG. 5, an insulating plastic plate 12 may be disposed detachably along the surface of the guide rail 5 to which the hanger support roller 4 is held, so as to reduce the frequency for replacing the expensive guide rail 5 having the surface insulating coating.

Further, also as shown in FIG. 5, the hanger support roller 4 is desirably attached at a position slightly above the lowermost end of the vertical portion 2a of the L-shaped hanger 2, i.e., at such a height that the guide rail 5 can hold the vertical portion 2a of the L-shaped hanger 2 when it is tilted upon breaking of the hanger support roller 4, so that accidental falling of the car body W can be prevented even if the hanger support roller 4 is be broken.

Figure 2:
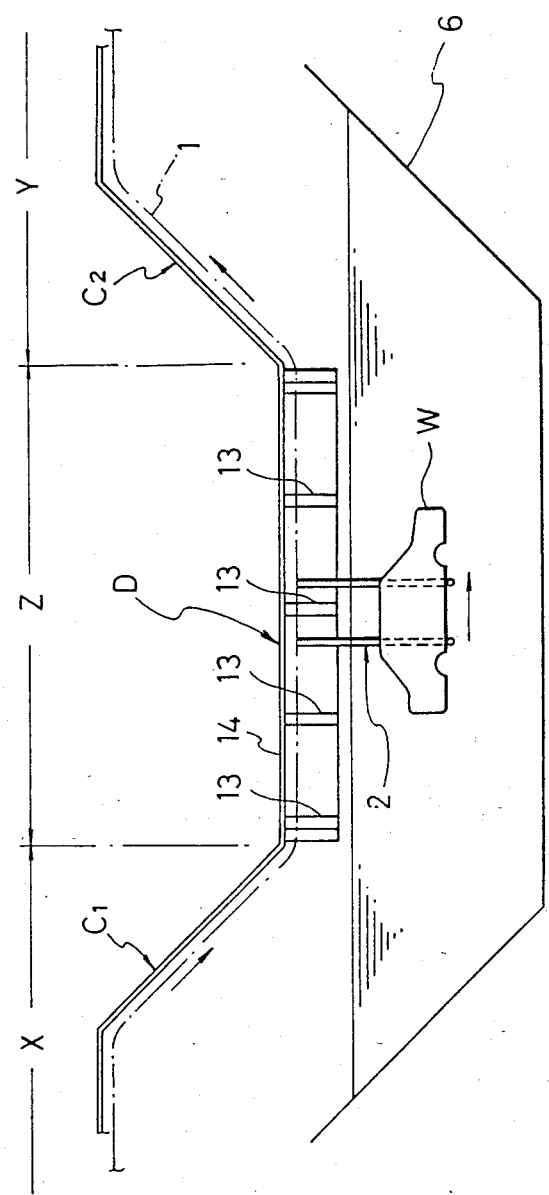
FIG. 2 is a side elevational view thereof.

The conveyor 1 for transporting the car body W carried on the L-shaped hanger 2 into the electrodeposition vessel 6 is mounted to a conveyor frame 13 of a gate-shaped configuration disposed along the left wall 7L above the electrodeposition vessel 6 as shown in FIGS. 1 and 2.

As shown in FIG. 2, a plurality of conveyor frames 13 are disposed at a predetermined distance along the zone Z in which the car body w carried on the L-shaped hanger 2 is completely immersed in the solution of the electrodeposition vessel 6. Both of the right and left sides and the upper surface of the conveyor frames 13 are closed with plate members 14 made of steel plates, etc. over the entire zone Z to constitute a tunnel-shaped duct D.

The duct D is disposed such that the lower end is at the same level with the upper opening of the electrodeposition vessel 6. Inspection covers 15R and 15L each connected in plurality are attached on both sides of the ducts for closing the upper surface of the electrodeposition vessel 6.

A plurality of inspection covers 16 that can be opened and closed from the side of the left wall 7L of the electrodeposition vessel 6 are disposed at a predetermined distance on the side of the duct D.

Further, as shown in FIG. 2, chambers $C_1$ and $C_2$ are disposed at the inlet and the outlet of the electrodeposition vessel 6 for isolating the zones X and Y in which the car body W is not completely immersed from the external circumstance.

This enables to suppress the evaporation of the solution of electrodeposition paint from the inside of the electrodeposition vessel 6, as well as prevent the intrusion of dusts, etc. from the outside into the electrodeposition vessel 6.

Membrane electrodes 17R, 17L or the guide rail 5 disposed in the electrodeposition vessel 6 can easily be inspected or replaced by an operator who stands on decks 18R, 18L disposed on the right and left side walls 7L, 7R of the electrodeposition vessel 6 and opens the inspection covers 15R, 15L.

The conveyor 1 can be inspected also by an operator who stands on the deck 18L and opens the inspection cover 16.

Since the conveyor 1 can be localized to the left wall 7L of the electrodeposition vessel 6 because of the L-shaped configuration of the hanger 2, the operator can always conduct inspection in a stable posture without pushing himself forward from the deck 18L toward the center of the electrodeposition vessel 6 in which the solution of electrodeposition paint is often present upon inspection.

This can facilitate the conveyor inspection operation, as well as protect the operator from accidental falling into the electrodeposition vessel.

In addition, the upper surface of the electrodeposition vessel 6 is closed with the duct D comprising the conveyor frames 13 and the left and right inspection covers 15R, 15L attached to the duct D over the zone Z in which the car body W is completely immersed. Accordingly, such a chamber as entirely enclosing the electrodeposition vessel 6 is no more necessary for the zone Z and it is only necessary for disposing the chambers $C_l$ and $C_2$ respectively at the exit and the inlet for the electrodeposition vessel 6. This can greatly reduce the installation cost.

Next, the upper end of the vertical portion 2a of the L-shaped hanger is suspended by way of a C-sectioned steel material 19 to the conveyor rail 3. The C-sectioned steel member 19 is brought into sliding contact with an electric collector 20 attached to the conveyor frame 13, so that the L-shaped hanger 2 is connected with an electric source of a polarity different from that of the membrane electrodes 17R, 17L in the electrodeposition vessel 6.

The C-sectioned steel member 19 has a hanger support roller 22 which is held on the guide rail 21 attached to the conveyor frame 13 from the side of the left wall 7L of the electrodeposition vessel 6. Accordingly, the roller 22 can receive the vertical portion 2a of the L-shaped hanger 2 that tends to rotate toward the right wall 7R of the electrodeposition vessel 6 around the hanger support roller 4 held against the guide rail 5 as a fulcrum.

The conveyor frame 13 has an L-shaped auxiliary electrode 23 that protrudes downwardly to the roof portion of the car body W that is immersed in the solution of electrodeposition paint while being carried on the L-shaped hanger 2.

The auxiliary electrode 23 is attached to the lower end of a piston rod 25 of a cylinder 24 extended downwardly from the conveyor frame 13, so that it may be moved vertically to adjust an appropriate distance relative to the roof portion in accordance with the height of the car body W. The auxiliary electrode 23 has the same electric polarity as that of the membrane electrodes 17R, 17L in the electrodeposition vessel 6.

Since the distance between the auxiliary electrode 23 and the car body W is made variable by the cylinder 24, troublesome control for changing the voltage applied to the auxiliary electrode 23 is no more necessary and the thickness of the electrodeposited layers can be adjusted easily.

In a case where the thickness of the coated layers in the roof portion may be somewhat reduced as compared with other portions depending on the type of the car, electric supply to the auxiliary electrode for the roof portion is usually interrupted since economization of the solution of electrodeposition paint is rather preferred than making the thickness of the coated layers constant over the entire portion of the car body W. However, if the auxiliary electrode is always immersed in the solution of electrodeposition paint, since it is still maintained at an intermediate potential and possesses the effect as the electrode even after the electric supply is interrupted, deposition of the solutions is still continued to the roof portion failing to obtain desired economization for the paint solution.

In this embodiment, since the auxiliary electrode is vertically movable by the cylinder 24 and can completely be withdrawn from the solution of electrodeposition paint, when it is not necessary, satisfactory economization can be attained for the paint solution.

Figure 6:
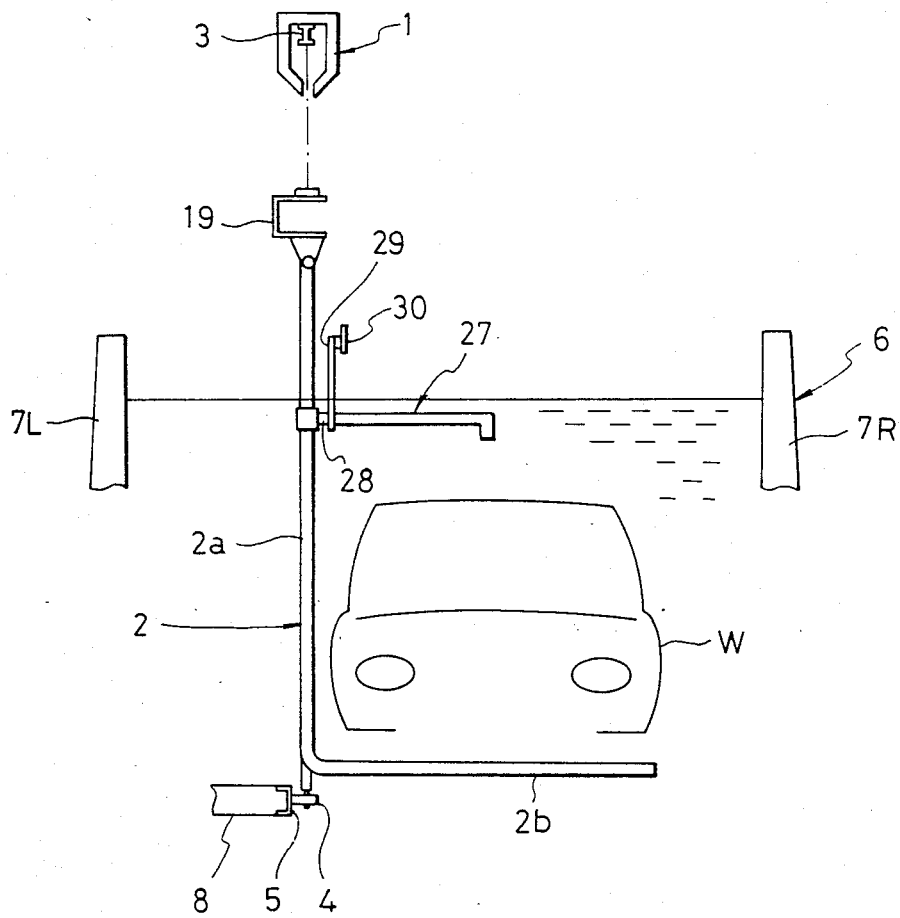
FIG. 6 is a front elevational view showing one embodiment of the auxiliary electrode disposed to the L-shaped hanger.

The auxiliary electrode may also be provided to the vertical portion 2a of the L-shaped hanger 2 as shown in FIG. 6.

Specifically, the auxiliary electrode 27 shown in FIG. 6 is protruded in the horizontal direction from the vertical portion 2a of the L-shaped hanger 2 by way of an insulation member 28 and made rotatable within the horizontal plane.

An electric collector 29 stands on the base end of the auxiliary electrode 27 in the vicinity of the insulation member 28, and the electric collector 29 is in sliding contact with a bus bar 30, so that the auxiliary electrode 27 has the same electric polarity with that of the membrane electrodes 17R, 17L.

When the car body W is conveyed through the pre-treatment step, the auxiliary electrode 27 protruded from the vertical portion 2a of the L-shaped hanger 2 is previously rotated so as to be in parallel with the conveying direction and completely retracted from above the car body W.

Therefore, if the pre-treatment liquid sprayed to the car body W clings to the auxiliary electrode 27, the droplets do not fall to the upper surface of the car body W. Accordingly, there is no worry that the pre-treatment liquid stains the upper surface of the car body W after passed through the pre-treatment step, to cause defects in the deposited layers of electrodeposition coating.

Further, if the hanger 2 provided with the auxiliary electrode 27 can be used with no troubles also in common with the pre-treatment step, troublesome labours of exchanging hangers can be saved upon transferring the car body W from the pre-treatment step to the electrodeposition step.

Figure 7:
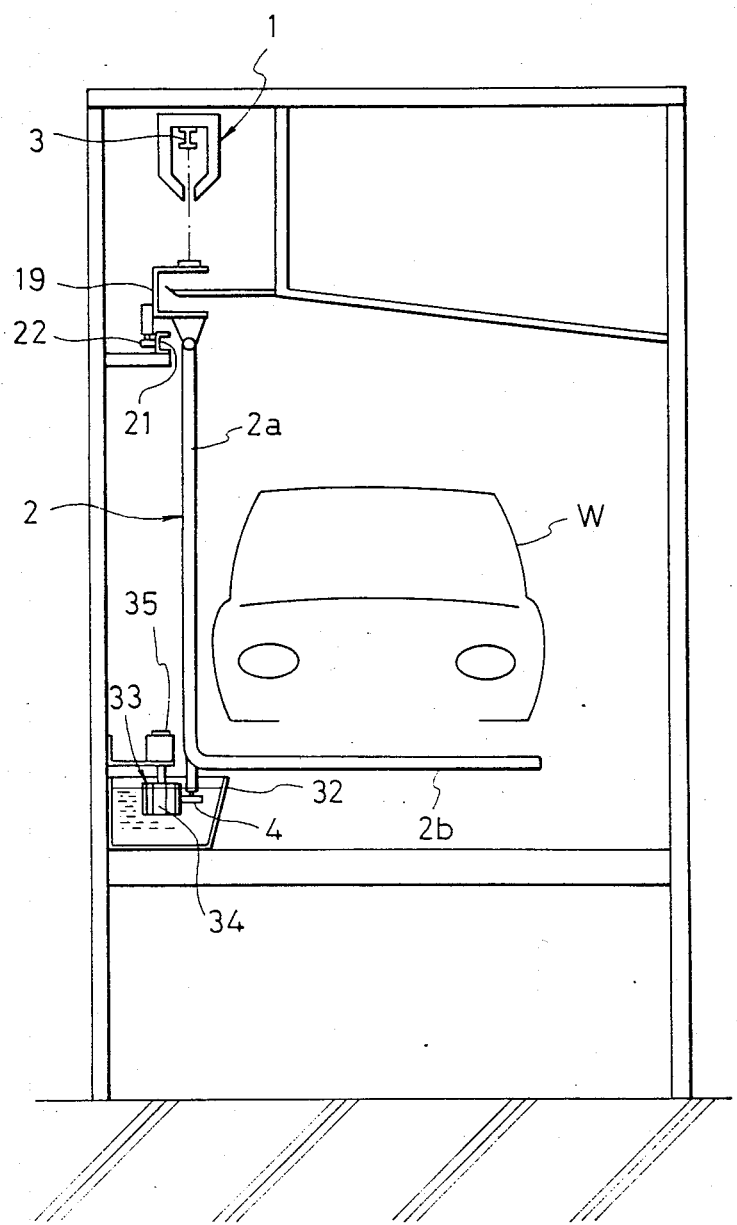
FIG. 7 is a front elevational view showing the facility disposed subsequent to an electrodeposition vessel.
Figure 8:
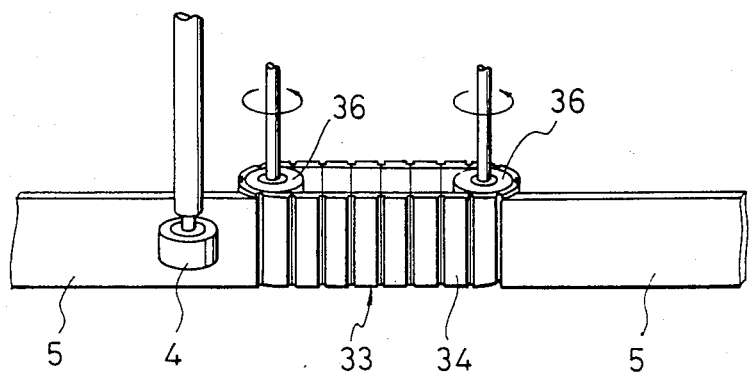
FIG. 8 is a side elevational view showing a portion thereof.

Because the hanger 2 is formed as the L-shaped configuration, the auxiliary electrode 23 can be disposed just above the car body W immersed in the electrodeposition vessel 6 as shown in FIG. 1. Further, as an additional merit of using the L-shaped hanger, a riser pipe 31 for circulating the solution of electrodeposition paint can be disposed not only at the bottom of the electrodeposition vessel 6 but also just beneath the liquid surface. This can prevent the components of the solution from stagnating and precipitating on the upper surface of the car body W immersed in the solution of electrodeposition paint, as well as increase the cooling effect for the upper surface, to thereby prevent the coated film from being roughened upon generation of heat. FIG. 7 is a front elevational view of a facility disposed subsequent to the electrodeposition vessel and FIG. 8 is a side elevational view for a portion thereof. A guide rail 5 for guiding and holding the L-shaped hanger after passing through the electrodeposition vessel is laid so as to pass through a cleaning vessel 32 disposed subsequent to the electrodeposition vessel 6. As shown in FIGS. 7 and 8, the guide rail 5 is recessed or cut-away for a predetermined length at an intermediate portion thereof immersed in a cleaning liquid stored in the cleaning vessel 32 and a rotational driving member 33 is intervened to this cut-away portion, so that the hanger support roller 4 of the L-shaped hanger 2 is abutted against the member 33 and compulsorily rotated at a high speed.

The rotational driving member 33 comprises an endless belt 34 made of steel material, which is laid around a pair of sprockets 36, 36 driven by a motor 35, so that the hanger support roller 4 that moves along and abuts against the endless belt 34 is compulsorily rotated.

As the cleaning liquid in the cleaning vessel 32, an electrode solution discharged from the partition membrane electrodes 17R, 17L in the electrodeposition vessel 6, acetic acid or formic acid is used in a case where the electodeposition paint adhered to the hanger support 4 is of cationic material.

In this embodiment, electrodeposition paints intruding even into the narrow gap between the rotational shaft and the bearing of the hanger support rollers 4 can be washed out completely by the compulsory rotation thereof.

As the rotational driving member 33, rollers, etc. may also be used instead of the endless belt 24.

Figure 9:
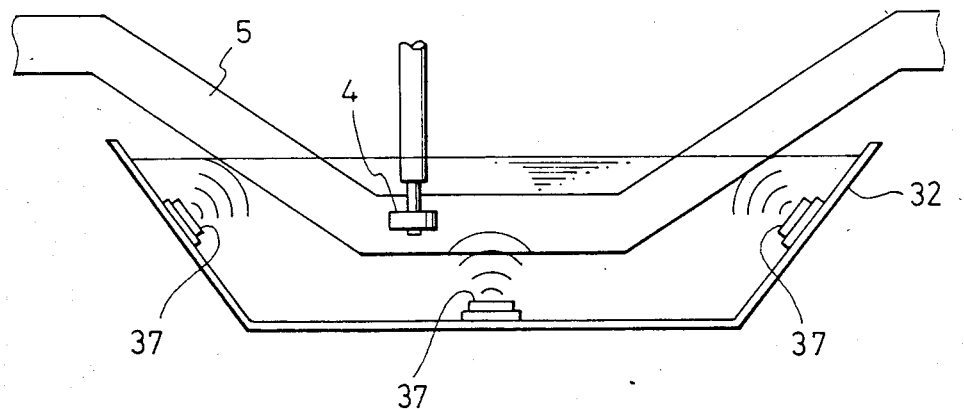
FIG. 9 is a side elevational view showing a modified embodiment.

As shown in FIG. 9, supersonic wave generators 37 may be disposed at the bottom in the cleaning vessel 32 instead of or in combination with the rotational driving member 33 as shown in FIG. 9, so that supersonic vibrations are given to the hanger support roller 4 immersed in the cleaning liquid to remove electrodeposition paints adhered to the surface thereof.

By any of the means described above, electrodeposition paints adhered to the surface of the hanger support roller 4 can surely be prevented from drying and solidification, which would otherwise hinder the rotation of the roller 4. Therefore, this can prevent the dropping accident of the car body W or the breaking accident of the guide rail 5, etc. caused by the rattling of the L-shaped hanger 2.

Further, if electrodeposition paints adhered to and dried in the hanger support 4 should happen to be peeled off and dropped into the solutions of pre-treatment liquid or electrodeposition paint, they will result in seedings which would cause defects in the coated paint layers at the surface of the car body W. However, such troubles can also be prevented.

As has been described above, according to the present invention, since the hanger suspended from the conveyor carrying article to be coated is formed into an L-shaped configuration, there is no troubles that droplets of the solutions of pre-treatment liquid or electrodeposition paint adhered to the hanger, or lubricants, dusts, etc. adhered to the conveyor rail for suspending the hanger should drop over the article to be coated.

Further, since the L-shaped hanger has the hanger support roller disposed to the lower end thereof and held by the guide rail, it can smoothly move along the electrodeposition line.

Since the guide rail for guiding and holding the L-shaped hanger in the electrodeposition vessel is supported by the insulating support member disposed in the electrodeposition vessel, the L-shaped hanger can surely be insulated electrically from the electrodeposition vessel.

Furthermore, since the cleaning mechanism is disposed subsequent to the electrodeposition vessel for completely washing out the electrodeposition paint adhered to the hanger support roller, there is no such troubles as electrodeposition paints adhered to the hanger support roller are dried and solidified, thereby making the roller no more rotatable or the paint dusts are peeled off from the roller and mixed into the solutions of pre-treatment liquid or the electrodeposition paint.

Accordingly, the present invention has an excellent effect capable of desirably maintaining the quality of coated paint layers upon electrodeposition coating.

As many apparently widely different embodiments of this invention may be made without departing from the spirit and scope thereof, it is to be understood that the invention is not limited to the specific embodiments thereof except as defined in the appended claims.

What is claimed is:

1. An electrodeposition coating facility comprising:
   conveyor means for conveying articles to be coated,
   hanger means each suspended from the conveyor means for carrying an article to be coated and formed into an L-shaped configuration composed of a vertical portion and a horizontal portion,
   hanger support roller means, each disposed at or near the lower end of said L-shaped hanger means, and
   guide rail means laid along an electrodeposition coating line for guiding and holding said hanger support roller means, and
   support means each comprising a stud made of insulating reinforced plastic secured to an electrodeposition vessel and a metal support applied with insulative coating and secured in connection with the top end of said stud for fixing the guide rail to the electrodeposition vessel.

2. An electrodeposition coating facility as defined in claim 1, wherein the guide rail means is laid at such a height as capable of holding the vertical portion of the the L-shaped hanger means when it is tilted upon breakage of the hanger support means.

3. An electrodeposition coating facility comprising:
   conveyor means for conveying articles to be coated,
   hanger means each suspended from the conveyor means for carrying an article to be coated and formed into an L-shaped configuration composed of a vertical portion and a horizontal portion, hanger support roller means, each disposed at or near the lower end of said L-shaped hanger means, and guide rail means laid along an electrodeposition coating line for guiding and holding said hanger support roller means, in which said guide rail means is laid so as to pass through a cleaning vessel disposed subsequent to an electrodeposition vessel, and rotational driving means is disposed for a predetermined length along an intermediate path of said guide rail means immersed in said cleaning liquid in said cleaning vessel so that the hanger support roller means is caused to abut against and thereby rotated compulsorily by said rotational driving means.

4. An electrodeposition coating facility as defined in claim 3, wherein the rotational driving means comprises a rotating member intervened for a predetermined length to an intermediate recessed portion of said guide rail means.

5. An electrodeposition coating facility comprising:

conveyor means for conveying articles to be coated, hanger means each suspended from the conveyor means for carrying an article to be coated and formed into an L-shaped configuration composed of a vertical portion and a horizontal portion, hanger support roller means, each disposed at or near the lower end of said L-shaped hanger means, and guide rail means laid along an electrodeposition coating line for guiding and holding said hanger support roller means, in which said guide rail means is laid so as to pass through a cleaning vessel disposed subsequent to an electrodeposition vessel, and supersonic wave generators are disposed in said vessel for giving supersonic vibrations to said hanger support means immersed in the cleaning liquid in said cleaning vessel.

* * * * *